H. COOPER.
UNIVERSAL JOINT.
APPLICATION FILED APR. 28, 1911. RENEWED JUNE 21, 1912.
1,033,784.
Patented July 30, 1912.
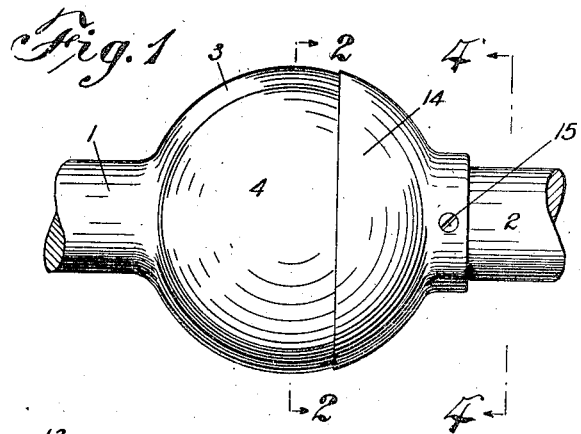
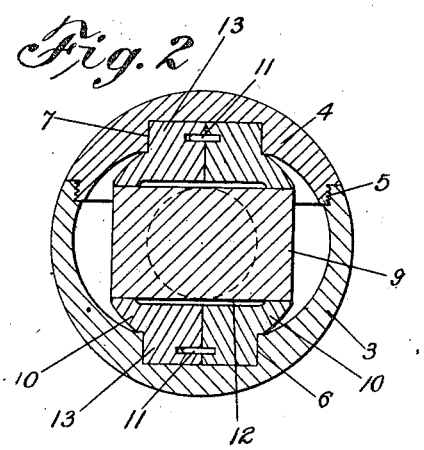
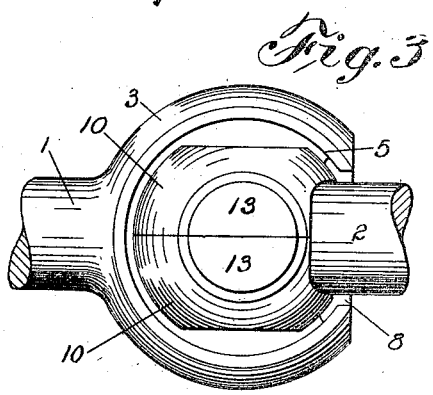
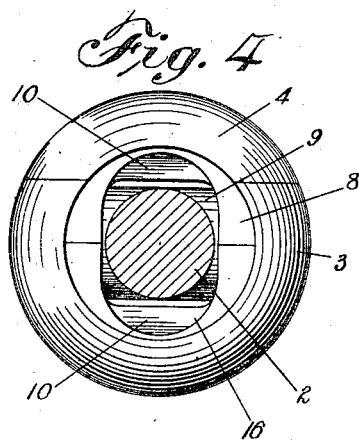
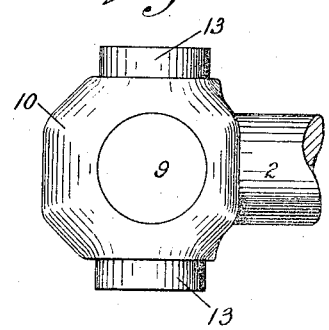
Attest
Frank H Vick Jr.
Albert Thompson
Inventor
Herbert Cooper
by Sydney Prescott, Atty.

UNITED STATES PATENT OFFICE.

HERBERT COOPER, OF BROOKLYN, NEW YORK.

UNIVERSAL JOINT.

1,033,784.   Specification of Letters Patent.   Patented July 30, 1912.

Application filed April 28, 1911, Serial No. 623,876. Renewed June 21, 1912. Serial No. 705,099.

*To all whom it may concern:*

Be it known that I, HERBERT COOPER, a citizen of the United States, residing at Brooklyn, county of Kings, and State of New York, have invented a new and useful Improvement in Universal Joints, of which the following is a specification.

This invention relates to an improvement in universal joints, and the main object thereof is to produce a joint that is compact, self-lubricating and dust proof, and adapted for use wherever universal joints are used, particularly in the transmission gearing of automobiles.

The invention consists in certain constructions and combinations which will be hereinafter fully described and then specifically set forth in the claims hereunto appended.

In the accompanying drawings which form a part of this specification and in which like characters of reference indicate the same or like parts, Figure 1 is a general view of a device constructed in accordance with the invention, Fig. 2 is a cross sectional view taken on the line 2—2 in Fig. 1, Fig. 3 is a view similar to Fig. 1 but with the dust cap and a part of the casing removed, Fig. 4 is a cross sectional view taken on the line 4—4 in Fig. 1, and Fig. 5 is a detail view of the T and driving connection removed from the casing.

In carrying the invention into effect, there is provided a driving member and a driven member, one of the members carrying a hollow substantially spherical casing having two internal oppositely-positioned sockets and the other member carrying a T within the casing. There is further provided a driving connection engaging the T and sockets for transmitting motion from one member to the other. Although not essential in all constructions; in the best constructions, there is further provided a cup engaging the outer surface of the casing to retain lubricant therein and to exclude dust therefrom, this cup being carried by the member carrying the T. All of the elements just mentioned may vary in construction within wide limits.

In the particular device selected to illustrate the invention, a driving member in the form of a shaft 1, and a driven member also in the form of a shaft 2, are employed. It is to be understood, however, that the shaft 2 may be the driver and the shaft 1 the driven member. In order to inclose the joint in compact form, the driving member is provided with a hollow substantially spherical casing 3 which is formed integrally with the member. This casing is constructed in two parts in order to facilitate the assembling and dismantling of the device. The second part is marked 4 and consists in a circular cap which is screwed to the main part of the casing at 5 and in planes parallel with but offset from the axis of the driving member or shaft 1. The casing is provided with two internal oppositely-positioned sockets, one marked 6 being in the main part of the casing and another marked 7 being in the cap. The driven member or shaft 2 projects through the open end 8 of the casing and is provided with an integral T 9 within the casing.

For the purpose of transmitting motion from the driving member to the driven member, there is provided a driving connection engaging the T and the sockets of the casing before referred to. This connection consists in a pair of twin parts 10 doweled together at 11. The connection has an aperture 12 engaging the T, and is further provided with a pair of trunnions 13 engaging the sockets 6 and 7, the axis of the trunnions lying at right angle to the axis of the aperture.

For the purpose of retaining a lubricant within the casing and excluding dust therefrom, there is provided a cup 14 fitted to the driven member or shaft 2 and held in place thereon by a set screw 15. This cup engages the outer surface of the casing 3 upon which it is free to slide and closes the opening 8 in the end thereof.

It will be readily understood that the rotation of the trunnions in the sockets permits movement of the driven member in one direction with respect to the driving member, and that the rotation of the T within the aperture permits movement in a direction at right angle to the trunnion movement, the driving connection being cut away at 16 to permit this movement.

Changes and variations may be made in the structures by means of which the invention is carried into effect. The invention, therefore, is not to be restricted to the precise details of the structure shown and described.

What is claimed is:

1. In a universal joint, the combination with a driving member, of a driven member, a two-part hollow substantially spherical casing open at one end and carried by one of the members and having two internal oppositely-positioned sockets which do not extend to the outside of the casing, the two parts being screwed together, a T carried by the other member within the casing, driving connections engaging the T and the sockets of the casing, and a closure for the open end of the casing carried by the member carrying the T.

2. In a universal joint, the combination with a driving member, of a driven member, a two-part hollow substantially spherical casing open at one end and carried by one of the members and having two internal oppositely-positioned sockets which do not extend to the outside of the casing, the two parts being screwed together in planes parallel with but offset from the axis of the member carrying casing, a T carried by the other member within the casing, driving connections engaging the T and the sockets of the casing, and a closure for the open end of the casing.

3. In a universal joint, the combination with a driving member, of a driven member, a two-part hollow substantially spherical casing open at one end and carried by one of the members and having two internal oppositely-positioned sockets which do not extend to the outside of the casing, the two parts being screwed together a T carried by the other member within the casing, a two-part driving connection engaging the T and the sockets of the casing, and a closure for the open end of the casing.

4. In a universal joint, the combination with a driving member, of a driven member, a two-part hollow substantially spherical casing open at one end and carried by one of the members and having two internal oppositely-positioned sockets which do not extend to the outside of the casing, the two parts being screwed together a T carried by the other member within the casing, a two-part driving connection consisting of twin sections each engaging the T and the sockets of the casing, and a closure for the open end of the casing.

5. In a universal joint, the combination with a driving member, of a driven member, a two-part hollow substantially spherical casing open at one end and carried by one of the members and having two internal oppositely-positioned sockets which do not extend to the outside of the casing, the two parts being screwed together a T carried by the other member within the casing, a two-part driving connection having an aperture engaging the T and a pair of trunnions the axis of which lies at right angles to the axis of the aperture said trunnions engaging the sockets of the casing, and a closure for the open end of the casing.

6. In a universal joint, the combination with a driving member, of a driven member, a two-part hollow substantially spherical casing open at one end and carried by one of the members and having two internal oppositely-positioned sockets which do not extend to the outside of the casing, the two parts being screwed together in planes parallel with but offset from the axis of the member carrying the casing, a T carried by the other member within the casing, a two-part driving connection having an aperture engaging the T and a pair of trunnions the axis of which lies at right angles to the axis of the aperture, said trunnions engaging the sockets of the casing, and a closure for the open end of the casing.

7. In a universal joint, the combination with a driving member, of a driven member, a two-part substantially-spherical casing open at one end and carried by one of the members and having two internal oppositely-positioned sockets, the two parts being screwed together in planes parallel with but offset from the axis of the member carrying the casing, a T carried by the other member within the casing, a cup carried by the member carrying the T and engaging the outer surface of the casing and covering the open end thereof, and a two-part driving connection having an aperture receiving the T and a pair of trunnions the axis of which lies at right angles to the axis of the aperture, said trunnions engaging the sockets of the casing.

In testimony whereof, I have signed my name to this specification in the presence of two subscribing witnesses.

HERBERT COOPER.

Witnesses:
SYDNEY J. PRESCOTT,
ALBERT THOMPSON.